(12) United States Patent
Zhao et al.

(10) Patent No.: US 11,203,551 B2
(45) Date of Patent: Dec. 21, 2021

(54) LOW BIOPERSISTENCE INORGANIC FIBER FREE OF CRYSTALLINE SILICA

(71) Applicant: Unifrax I LLC, Tonawanda, NY (US)

(72) Inventors: Donghui Zhao, Amherst, NY (US); Bruce K. Zoitos, Williamsville, NY (US); Michael J. Andrejcak, Tonawanda, NY (US); Jason M. Hamilton, Lancaster, NY (US); Karen L. Hanson, Youngstown, NY (US)

(73) Assignee: UNIFRAX I LLC, Tonawanda, NY (US)

( * ) Notice: Subject to any disclaimer, the term of this patent is extended or adjusted under 35 U.S.C. 154(b) by 54 days.

(21) Appl. No.: 16/152,878

(22) Filed: Oct. 5, 2018

(65) Prior Publication Data

US 2019/0106359 A1    Apr. 11, 2019

Related U.S. Application Data

(60) Provisional application No. 62/570,122, filed on Oct. 10, 2017.

(51) Int. Cl.

| | |
|---|---|
| *C04B 35/19* | (2006.01) |
| *C03C 13/06* | (2006.01) |
| *C04B 35/653* | (2006.01) |
| *C04B 35/622* | (2006.01) |
| *C09K 21/02* | (2006.01) |
| *F16L 59/02* | (2006.01) |
| *C03C 13/00* | (2006.01) |

(52) U.S. Cl.
CPC ............... *C04B 35/19* (2013.01); *C03C 13/00* (2013.01); *C04B 35/62245* (2013.01); *C04B 35/653* (2013.01); *C09K 21/02* (2013.01); *F16L 59/028* (2013.01); *C04B 2235/3201* (2013.01); *C04B 2235/3206* (2013.01); *C04B 2235/3208* (2013.01); *C04B 2235/3222* (2013.01); *C04B 2235/3224* (2013.01); *C04B 2235/3244* (2013.01); *C04B 2235/3272* (2013.01); *C04B 2235/3445* (2013.01); *C04B 2235/3472* (2013.01); *C04B 2235/5228* (2013.01); *C04B 2235/5264* (2013.01); *C04B 2235/72* (2013.01); *C04B 2235/9607* (2013.01)

(58) Field of Classification Search
CPC ..... C03C 13/00; C03C 13/001; C03C 13/006; C03C 13/06; C04B 35/62236; C04B 35/62227; C04B 35/62245
See application file for complete search history.

(56) References Cited

U.S. PATENT DOCUMENTS

| | | |
|---|---|---|
| 2,576,312 A | 11/1951 | Minnick |
| 2,690,393 A | 9/1954 | McGarvey |
| 2,699,415 A | 1/1955 | Nachtman |
| 2,876,120 A | 3/1959 | Machlan |
| 3,112,184 A | 11/1963 | Hollenbach |
| 3,380,818 A | 4/1968 | Smith |
| 3,383,275 A | 5/1968 | Croop et al. |
| 3,455,731 A | 7/1969 | Nielsen et al. |
| 3,469,729 A | 9/1969 | Grekila et al. |
| 3,597,179 A | 8/1971 | Simmons |
| 3,783,092 A | 1/1974 | Majumdar |
| 3,788,885 A | 1/1974 | Birchall et al. |
| 3,804,608 A | 4/1974 | Gaskell et al. |
| 3,804,646 A | 4/1974 | Dumbaugh, Jr. |
| 3,887,386 A | 6/1975 | Majumdar |
| 3,899,342 A | 8/1975 | Birchall et al. |
| 3,900,329 A | 8/1975 | Grubb et al. |
| 3,992,498 A | 11/1976 | Morton et al. |
| 4,037,015 A | 7/1977 | Koike et al. |
| 4,104,355 A | 8/1978 | Dunn et al. |
| 4,194,914 A | 3/1980 | Moriya et al. |
| 4,358,500 A | 11/1982 | George et al. |
| 4,375,493 A | 3/1983 | George et al. |
| 4,382,104 A | 5/1983 | Smith et al. |
| 4,396,661 A | 8/1983 | George et al. |
| 4,428,999 A | 1/1984 | George et al. |

(Continued)

FOREIGN PATENT DOCUMENTS

| | | |
|---|---|---|
| CA | 1271785 | 7/1990 |
| CA | 2043699 A1 | 12/1991 |

(Continued)

OTHER PUBLICATIONS

Chatterjee, "An Update on the Binary Calcium Aluminates Appearing in Aluminous Cements", The Associated Cement Cos. Ltd., Mumbai, India.
Shyu, et al., "Effect of TiO2 addition on the nucleation of apatite in an MgO—CaO—SiO2—P2O5 glass", Journal of Materials Science Letters 10 (1991) 1056-1058.
Knudsen, et al., "In-vitro dissolution rate of mineral fibres at pH 4.5 and 7.4—A new mathematical tool to evaluate the dependency on composition", Glass Sci. Technol. 78 (2005) No. 3.

(Continued)

*Primary Examiner* — Elizabeth A. Bolden

(74) *Attorney, Agent, or Firm* — Haynes and Boone, LLP

(57) ABSTRACT

An inorganic fiber containing silica, alumina, one or more alkali metal oxides, and one or more of alkaline earth metal oxides, transition metal oxides, or lanthanide series metal oxides. The inorganic fiber exhibits good thermal performance at use temperatures of 1260° C. and greater, retains mechanical integrity after exposure to the use temperatures, is free of crystalline silica upon devitrification, is alkali flux resistant, exhibits low bio-persistence in an acidic medium, and exhibits low dissolution in a neutral medium. Also provided are thermal insulation products incorporating the inorganic fibers, a method for preparing the inorganic fiber and a method of thermally insulating articles using thermal insulation prepared from the inorganic fibers.

14 Claims, 2 Drawing Sheets

(56) References Cited

U.S. PATENT DOCUMENTS

| | | |
|---|---|---|
| 4,507,355 A | 3/1985 | George et al. |
| 4,547,403 A | 10/1985 | Smith |
| 4,563,219 A | 1/1986 | George et al. |
| 4,604,097 A | 8/1986 | Graves, Jr. et al. |
| 4,613,577 A | 9/1986 | Tagai et al. |
| 4,659,610 A | 4/1987 | George et al. |
| 4,673,594 A | 6/1987 | Smith |
| 4,687,749 A | 8/1987 | Beall |
| 4,735,857 A | 4/1988 | Tagai et al. |
| 4,737,192 A | 4/1988 | Smith |
| 4,820,573 A | 4/1989 | Tagai et al. |
| 4,830,989 A | 5/1989 | Trivedi et al. |
| 4,933,307 A | 6/1990 | Marshall et al. |
| 5,108,957 A | 4/1992 | Cohen et al. |
| 5,145,734 A | 9/1992 | Ito et al. |
| 5,221,558 A | 6/1993 | Sonuparlak et al. |
| 5,223,336 A | 6/1993 | Griffith et al. |
| 5,250,488 A | 10/1993 | Thelohan et al. |
| 5,332,699 A | 7/1994 | Olds et al. |
| 5,346,575 A | 9/1994 | Griffith et al. |
| 5,346,868 A | 9/1994 | Eschner |
| 5,371,050 A | 12/1994 | Belitskus et al. |
| 5,480,676 A | 1/1996 | Sonuparlak et al. |
| 5,486,232 A | 1/1996 | Griffith et al. |
| 5,591,516 A | 1/1997 | Jaco et al. |
| RE35,557 E | 7/1997 | Thelohan et al. |
| 5,691,255 A | 11/1997 | Jensen et al. |
| 5,714,421 A | 2/1998 | Olds et al. |
| 5,858,465 A | 1/1999 | Hunt et al. |
| 5,874,375 A | 2/1999 | Zoitos et al. |
| 5,955,389 A | 9/1999 | Jubb |
| 5,962,354 A | 10/1999 | Fyles et al. |
| 5,968,648 A | 10/1999 | Rapp et al. |
| 5,994,247 A | 11/1999 | Jubb et al. |
| 5,998,315 A | 12/1999 | Jubb |
| 6,013,592 A | 1/2000 | Merrill et al. |
| 6,036,762 A | 3/2000 | Sambasivan |
| 6,037,284 A | 3/2000 | Holstein et al. |
| 6,037,288 A | 3/2000 | Robinson et al. |
| 6,180,546 B1 | 1/2001 | Jubb et al. |
| 6,284,684 B1 * | 9/2001 | Vignesoult ............... C03C 13/06 501/36 |
| 6,309,994 B1 | 10/2001 | Marra et al. |
| 6,313,050 B1 | 11/2001 | De Meringo et al. |
| 6,458,436 B1 | 10/2002 | Hansen et al. |
| 6,461,415 B1 | 10/2002 | Sambasivan et al. |
| 6,517,906 B1 | 2/2003 | Economy et al. |
| 6,652,950 B2 | 11/2003 | Barney et al. |
| 6,716,407 B2 | 4/2004 | Davis et al. |
| 6,855,298 B2 | 2/2005 | Teneyck |
| 6,897,173 B2 | 5/2005 | Bernard et al. |
| 8,026,190 B2 | 9/2011 | Keller et al. |
| 8,093,164 B2 | 1/2012 | Richter et al. |
| 8,163,377 B2 | 4/2012 | Wainwright et al. |
| 8,252,707 B2 | 8/2012 | McGinnis et al. |
| 8,652,980 B2 | 2/2014 | Zoitos et al. |
| 8,877,102 B2 | 11/2014 | Bernard et al. |
| 9,556,063 B2 | 1/2017 | Zhao et al. |
| 9,708,214 B2 | 7/2017 | Zhao et al. |
| 9,919,954 B2 | 3/2018 | Zoitos et al. |
| 9,926,224 B2 | 3/2018 | Zhao et al. |
| 10,023,491 B2 | 7/2018 | Zhao et al. |
| 2002/0022567 A1 | 2/2002 | Li et al. |
| 2002/0032116 A1 | 3/2002 | Jubb et al. |
| 2002/0045528 A1 | 4/2002 | Kusuno et al. |
| 2002/0107133 A1 | 8/2002 | Troczynski et al. |
| 2003/0049329 A1 | 3/2003 | Lee et al. |
| 2003/0138673 A1 | 7/2003 | Sambasivan et al. |
| 2003/0162019 A1 | 8/2003 | Zoitos et al. |
| 2003/0181306 A1 | 9/2003 | Bernard et al. |
| 2004/0011245 A1 | 1/2004 | Sambasivan et al. |
| 2004/0092379 A1 | 5/2004 | Lewis |
| 2005/0003726 A1 | 1/2005 | Zguris et al. |
| 2005/0013873 A1 | 1/2005 | Fechner et al. |
| 2005/0032620 A1 | 2/2005 | Zoitos et al. |
| 2005/0079970 A1 | 4/2005 | Otaki et al. |
| 2006/0094583 A1 | 5/2006 | Freeman et al. |
| 2007/0020454 A1 | 1/2007 | Zoitos et al. |
| 2007/0275843 A1 | 11/2007 | Lewis |
| 2008/0146430 A1 | 6/2008 | Li et al. |
| 2009/0042030 A1 | 2/2009 | Douce et al. |
| 2010/0055457 A1 | 3/2010 | Jubb |
| 2012/0160104 A1 | 6/2012 | Vulfson |
| 2012/0247156 A1 | 10/2012 | Kitahara et al. |
| 2013/0225025 A1 | 8/2013 | McGinnis et al. |
| 2014/0000089 A1 | 1/2014 | Zoitos et al. |
| 2014/0170921 A1 | 6/2014 | Zoitos et al. |
| 2015/0052880 A1 | 2/2015 | Vandervoort |
| 2015/0163861 A1 | 6/2015 | Mihara et al. |
| 2015/0175477 A1 | 6/2015 | Zhao et al. |
| 2015/0259243 A1 | 9/2015 | McGinnis et al. |
| 2016/0017519 A1 | 1/2016 | Zhao et al. |
| 2016/0018048 A1 | 1/2016 | Zhao et al. |
| 2016/0168019 A1 | 6/2016 | Wainwright et al. |
| 2017/0101338 A1 | 4/2017 | Li et al. |
| 2017/0121861 A1 | 5/2017 | Zhao et al. |
| 2017/0121862 A1 | 5/2017 | Zhao et al. |
| 2017/0203999 A1 | 7/2017 | Zhao et al. |
| 2017/0204537 A1 | 7/2017 | Zhao et al. |
| 2017/0297951 A1 | 10/2017 | Zhao et al. |

FOREIGN PATENT DOCUMENTS

| | | | |
|---|---|---|---|
| CA | 2167077 A1 | 12/1995 | |
| CA | 2017344 C | 9/2002 | |
| CN | 1634785 A | 7/2005 | |
| CN | 101356129 B | 7/2013 | |
| CN | 103339323 A | 10/2013 | |
| DE | 19638542 A1 | 3/1997 | |
| EP | 0074655 A1 | 3/1983 | |
| EP | 0132078 A2 | 1/1985 | |
| EP | 0142715 A2 | 5/1985 | |
| EP | 0146398 A2 | 6/1985 | |
| EP | 0155550 A1 | 9/1985 | |
| EP | 0178688 A2 | 4/1986 | |
| EP | 0178689 A2 | 4/1986 | |
| EP | 0186128 A2 | 7/1986 | |
| EP | 0222478 A1 | 5/1987 | |
| EP | 0302465 A2 | 2/1989 | |
| EP | 0417493 A2 | 3/1991 | |
| EP | 0427873 A1 | 5/1991 | |
| EP | 0539342 A1 | 4/1993 | |
| EP | 0586797 A1 | 3/1994 | |
| EP | 0834489 A1 | 4/1998 | |
| EP | 1086936 A2 | 3/2001 | |
| EP | 1323687 A2 | 7/2003 | |
| EP | 1908737 A1 | 4/2008 | |
| EP | 1725503 B1 | 7/2008 | |
| EP | 2634308 A1 | 9/2013 | |
| EP | 2894132 A1 | 7/2015 | |
| EP | 3026029 A1 | 6/2016 | |
| EP | 3026029 A1 * | 6/2016 | ............ C03C 3/087 |
| FR | 2662687 A1 | 12/1991 | |
| FR | 2778399 A1 | 11/1999 | |
| FR | 2778401 A1 | 11/1999 | |
| GB | 520247 | 4/1940 | |
| GB | 1360197 | 7/1974 | |
| GB | 1360198 | 7/1974 | |
| GB | 1360199 | 7/1974 | |
| GB | 1360200 | 7/1974 | |
| GB | 2047766 A | 12/1980 | |
| GB | 2200129 A | 7/1988 | |
| GB | 2383793 A | 7/2003 | |
| JP | S5846121 A | 3/1983 | |
| JP | 3132234 B2 | 2/2001 | |
| JP | 2002338300 | 11/2002 | |
| JP | 2003003335 A | 1/2003 | |
| JP | 2003089547 A | 3/2003 | |
| JP | 2004036050 A | 2/2004 | |
| JP | 2005089913 A | 4/2005 | |
| JP | 2005281079 A | 10/2005 | |
| JP | 2006272116 | 10/2006 | |
| JP | 2007033546 | 2/2007 | |
| JP | 3938671 B2 | 6/2007 | |

(56) References Cited

FOREIGN PATENT DOCUMENTS

| | | |
|---|---|---|
| JP | 2007303011 | 11/2007 |
| JP | 2011105554 A | 6/2011 |
| JP | 4985337 B2 | 7/2012 |
| JP | 2017-508705 A | 3/2017 |
| KR | 20040013846 A | 2/2004 |
| KR | 100469776 | 1/2005 |
| KR | 20100084917 A | 7/2010 |
| WO | 8502393 A1 | 6/1985 |
| WO | 8502394 A1 | 6/1985 |
| WO | 8705007 A1 | 8/1987 |
| WO | 8912032 A2 | 12/1989 |
| WO | 9002713 A1 | 3/1990 |
| WO | 9207801 A1 | 5/1992 |
| WO | 9209536 A1 | 6/1992 |
| WO | 9315028 A1 | 8/1993 |
| WO | 9415883 A1 | 7/1994 |
| WO | 9532925 A1 | 12/1995 |
| WO | 9532926 A1 | 12/1995 |
| WO | 9605147 A1 | 2/1996 |
| WO | 9629201 A1 | 9/1996 |
| WO | 9716386 A1 | 5/1997 |
| WO | 9720782 A1 | 6/1997 |
| WO | 9805600 A1 | 2/1998 |
| WO | WO 98/23547 A1 | 6/1998 |
| WO | 9832606 A1 | 7/1998 |
| WO | 9851981 A1 | 11/1998 |
| WO | 0216263 A1 | 2/2002 |
| WO | 03025284 A1 | 3/2003 |
| WO | 03031368 A2 | 4/2003 |
| WO | 03050054 A1 | 6/2003 |
| WO | 03059835 A1 | 7/2003 |
| WO | 03060016 A1 | 7/2003 |
| WO | 2006048610 A1 | 5/2006 |
| WO | 2007005836 A2 | 1/2007 |
| WO | 2007054697 A1 | 5/2007 |
| WO | 2007086677 A1 | 8/2007 |
| WO | 2008005008 A2 | 1/2008 |
| WO | 2013096471 A1 | 6/2013 |
| WO | WO-2015011930 A1 * | 1/2015 ....... C04B 35/62245 |
| WO | 2015100320 A1 | 7/2015 |

OTHER PUBLICATIONS

Onoda, Jr., et al., "Low-Silica Glasses Based on Calcium Aluminates", Journal of the American Ceramic Society, vol. 53, No. 6, Jun. 1970.

Shelby, "Introduction to Glass Science and Technology" The Royal Society of Chemistry 1997.

Wallenberger, et al. "Inviscid melt spinning: As-spun crystalline alumina fibers" Journal of Material Research vol. 5, No. 11, Nov. 1990.

International Search Report and Written Opinion received in International Application No. PCT/US2018/054636, dated Mar. 27, 2019.

Supplementary European Search Report issued in European Patent Application No. 18866035.1, dated May 25, 2021, 9 pgs.

First Office Action for Japanese Patent Application No. 2020-519435 by the Japan Patent Office, dated Jun. 1, 2021, (6 pgs.).

English Translation of First Office Action for Japanese Patent Application No. 2020-519435 by the Japan Patent Office, dated Jun. 1, 2021, (5 pgs.).

* cited by examiner

LOW BIOPERSISTENCE INORGANIC FIBER FREE OF CRYSTALLINE SILICA

CROSS REFERENCE TO RELATED APPLICATIONS

The present application claims the benefit of the filing date under 35 U.S.C. § 119(e) of United States Provisional Application for Patent Ser. No. 62/570,122 filed Oct. 10, 2017, which is hereby incorporation by reference in its entirety.

TECHNICAL FIELD

A high temperature resistant inorganic fiber that is useful as a thermal, electrical, or acoustical insulating material, insulation materials prepared with a plurality of the high temperature resistant inorganic fibers, methods of making the high temperature resistant inorganic fiber, and methods of using the high temperature resistant inorganic fibers and insulation materials in methods of acoustically, electrically and thermally insulating articles.

BACKGROUND

Refractory ceramic fibers, such as those based on alumino-silicate chemistry, have been sold extensively for thermal and electrical insulation applications since their development in the 1940s. Rodent inhalation studies conducted in the 1980s demonstrated a level of carcinogenic potential associated with refractory ceramic fibers that are bio-persistent in physiological lung fluids. These studies have motivated the industry to develop physiological lung fluid-soluble and low bio-persistent inorganic fibers as an alternative to refractory ceramic fibers.

Inhalation of certain types of inorganic fibers can cause an increase in respiratory disease. For example, respiratory disease caused by the inhalation of asbestos fiber has been well studied and documented. Asbestos fiber is carcinogenic to humans as has been classified as an IARC-1 material. Inhalation of asbestos fibers is known to cause mesothelioma and other respiratory disease in humans, such as, for example, asbestosis and lung cancer.

The potential health hazard associated with the inhalation of fibers is generally influenced by three factors. According to WHO 2000, respirable fibers are defined as those fibers have a length greater than 5 μm, a diameter finer than 3 μm, and an aspect ratio (defined as fiber length divided by fiber width) greater than 3. Fibers that are shorter than 20 μm in length can be engulfed by human alveolar macrophages and then cleared from the lung region, whereas longer fibers remain in the lung until dissolved or broken apart into shorter pieces.

Since the 1990s, a strategy has evolved to use fibers that are less durable in physiological lung fluid to reduce the potential health risk associated with the inhalation of inorganic fibers. These fibers are currently referred to in the art as low bio-persistence fibers. The strategy is to engineer the fiber composition to exhibit a higher dissolution rate in physiological lung fluid. Higher fiber dissolution rates results in faster clearance, or shorter residence time, of the fibers in the human lung, and also assists in disintegrating longer fibers into shorts ones.

In connection with the clearance of inorganic fibers from the lung, there are two pH environments in the human lung that must be considered. The extracellular fluid in the lung exhibits a near neutral pH, namely, in the range of pH 7.4-7.8. The environment within the alveolar macrophages of the human lung is acidic having a pH in the range of pH 4.5-5. It is thought that fibers exhibiting a low dissolution rate in simulated physiological lung fluid (SLF) of neutral or near neutral pH in in vitro tests can be cleared fast in an in vivo animal test. (Bellman and Muhle et al., *Persistence of man-made mineral fibers and asbestos in rat lungs*, Ann. Occup. Hyg. 31: 693-709 (1987)). Although the fibers may not be soluble in the neutral extracellular lung fluid, the fibers that are more soluble in an acidic environment may be fragmented into shorter lengths by the acidic attack within the alveolar macrophages, engulfed and cleared from the lung.

While candidate fibers have been proposed that seek to avoid formation of crystalline silica, the use temperature limit of these fibers have not been high enough to accommodate many of the applications to which high temperature resistant refractory ceramic fibers are traditionally used. For example, such candidate low bio-persistence fibers may exhibit high linear shrinkage at the continuous use temperatures and/or reduced mechanical properties when exposed to continuous use temperatures of 1260° C. and greater as compared to the performance of typical refractory ceramic fibers. Such low bio-persistence fibers are also more difficult to manufacture across a wide viscosity range.

SUMMARY

Provided is an inorganic fiber comprising the fiberization product of (i) about 15 to about 50 mol percent silica, (ii) about 10 to about 35 mol percent alumina, (iii) about 10 to about 35 mol percent of at least one alkali metal oxide, and (iv) about 15 to about 35 mol percent of at least one alkaline earth metal oxide, or at least one transition metal oxide, or at least lanthanide series metal oxide, or combinations thereof.

Additionally provided is a method for making an inorganic fiber, the method comprising forming a molten melt with ingredients comprising (i) about 15 to about 50 mol percent silica, (ii) about 10 to about 35 mol percent alumina, (iii) about 10 to about 35 mol percent of at least one alkali metal oxide, and (iv) about 15 to about 35 mol percent of at least one alkaline earth metal oxide, or at least one transition metal oxide, or at least lanthanide series metal oxide, or combinations thereof, and producing fibers from the molten melt.

Further provided is a method of thermally insulating an article at temperatures of 1260° C. and greater comprising disposing on, in, near, or around the article to be thermally insulated, a thermal insulation material comprising a plurality of inorganic fibers comprising the fiberization product of (i) about 15 to about 50 mol percent silica, (ii) about 10 to about 35 mol percent alumina, (iii) about 10 to about 35 mol percent of at least one alkali metal oxide, and (iv) about 15 to about 35 mol percent of at least one alkaline earth metal oxide, or at least one transition metal oxide, or at least lanthanide series metal oxide, or combinations thereof.

Further provided is an inorganic fiber containing insulation article selected from blankets, blocks, boards, caulking compositions, cement compositions, coatings, felts, mats, moldable compositions, modules, papers, pumpable compositions, putty compositions, sheets, tamping mixtures, vacuum cast shapes, vacuum cast forms, or woven textiles, braids, cloths, fabrics, ropes, tapes, sleeving, wicking, said fiber containing article comprising a plurality of inorganic fibers comprising the fiberization product of (i) about 15 to about 50 mol percent silica, (ii) about 10 to about 35 mol percent alumina, (iii) about 10 to about 35 mol percent of at least one alkali metal oxide, and (iv) about 15 to about 35 mol percent of at least one alkaline earth metal oxide, or at least one transition metal oxide, or at least lanthanide series metal oxide, or combinations thereof.

DETAILED DESCRIPTION

The inorganic fiber exhibits good thermal performance at use temperatures of 1260° C. and greater, retains mechanical integrity after exposure to the use temperatures, is free of crystalline silica upon devitrification, is alkali flux resistant, exhibits low bio-persistence in an acidic medium, and exhibits low dissolution in a neutral medium. A molten melt of the raw material ingredients for the inorganic fiber has a longer viscosity curve at lower temperature than the conventional ceramic fiber, such as alumino-silicates, such that it lowers fiberization temperature at which fibers may be formed from the melt, and eases overall melting and fiber manufacturing. This is an improvement over refractory ceramic fiber and alkaline earth silica fiber melts that have shorter viscosity ranges for fiberization, and which undergo rapid solidification during the cooling process.

Figure 1:
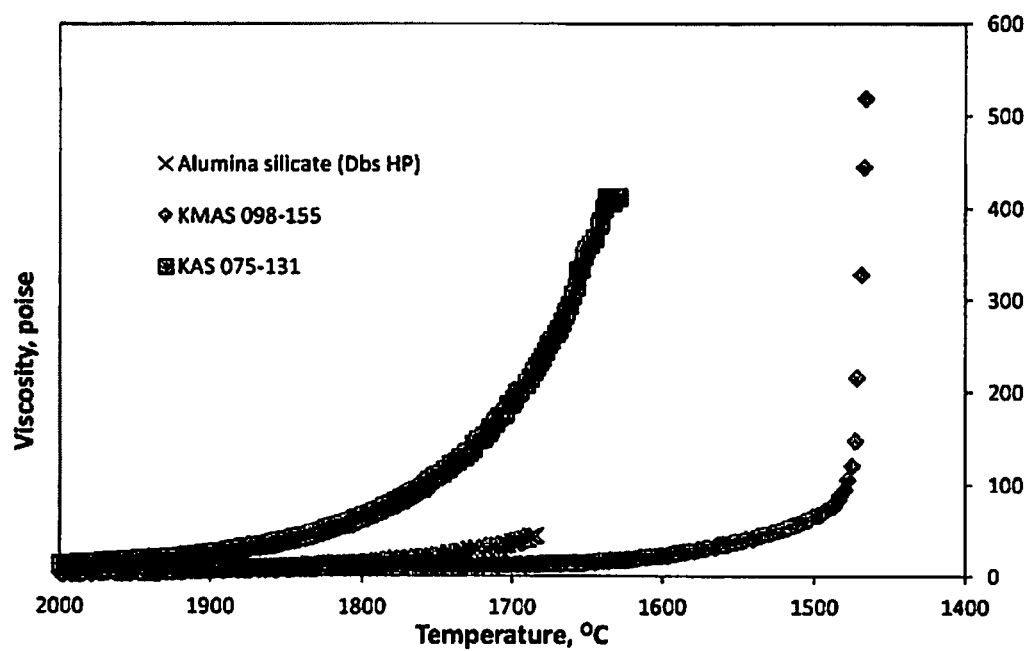
FIG. 1 is a graph temperature-viscosity graph showing the temperature dependence of viscosity on certain fiber melt compositions.

The melts for the present inorganic fiber have an extended viscosity range as compared to refractory ceramic fiber or alkaline earth silicate fibers which makes them suitable for forming continuous fibers by, for example, a fiber drawing process. The extended viscosity range of the present inorganic fiber as compared to a commercially available alumino-silicate fiber and a potassium-alumino-silicate silicate fiber is depicted in FIG. 1. The viscosity of the potassia-alumino-silicate fiber is much higher as compared to the viscosity of a typical refractory ceramic fiber based on alumino-silicate chemistry. As magnesia is added into the potassia-alumino-silicate chemistry, the viscosity is significantly reduced. As a result, the temperature-viscosity curve for the inventive fiber (for example, potassia-magnesia-alumino-silicate) is shifted to a much lower temperature, from about 1640° C. to about 1465° C. This shift in the temperature-viscosity curve of the inventive fibers lowers the operation temperature of melting and the temperature for fiberization. The melt of the inventive inorganic fiber chemistry retains its liquid/glassy state without any crystallization as it is being cooled down, thus providing an extended range of viscosity. The extended viscosity range enables the formation of continuous fibers by a suitable fiber drawing method.

The inorganic fiber comprises the fiberization product of (i) about 15 to about 50 mol percent silica, (ii) about 10 to about 35 mol percent alumina, (iii) about 10 to about 35 mol percent of at least one alkali metal oxide, and (iv) about 15 to about 35 mol percent of at least one alkaline earth metal oxide, or at least one transition metal oxide, or at least lanthanide series metal oxide, or combinations thereof.

According to certain illustrative embodiments, the inorganic fiber comprises the fiberization product of (i) about 15 to about 50 mol percent silica, (ii) about 10 to about 35 mol percent alumina, (iii) about 10 to about 35 mol percent of at least one alkali metal oxide, and (iv) about 15 to about 35 mol percent of at least one alkaline earth metal oxide.

According to certain illustrative embodiments, the inorganic fiber comprises the fiberization product of (i) about 15 to about 50 mol percent silica, (ii) about 10 to about 35 mol percent alumina, (iii) about 10 to about 35 mol percent of at least one alkali metal oxide, and (iv) about 15 to about 35 mol percent of at least one transition metal oxide.

According to certain illustrative embodiments, the inorganic fiber comprises the fiberization product of (i) about 15 to about 50 mol percent silica, (ii) about 10 to about 35 mol percent alumina, (iii) about 10 to about 35 mol percent of at least one alkali metal oxide, and (iv) about 15 to about 35 mol percent of at least one lanthanide series metal oxide.

According to certain illustrative embodiments, the inorganic fiber comprises the fiberization product of (i) about 15 to about 50 mol percent silica, (ii) about 10 to about 35 mol percent alumina, (iii) about 10 to about 35 mol percent of at least one alkali metal oxide, and (iv) about 15 to about 35 mol percent of a combination of at least one alkaline earth metal oxide and at least one transition metal oxide.

According to certain illustrative embodiments, the inorganic fiber comprises the fiberization product of (i) about 15 to about 50 mol percent silica, (ii) about 10 to about 35 mol percent alumina, (iii) about 10 to about 35 mol percent of at least one alkali metal oxide, and (iv) about 15 to about 35 mol percent of a combination of at least one alkaline earth metal oxide and at least lanthanide series metal oxide.

According to certain illustrative embodiments, the inorganic fiber comprises the fiberization product of (i) about 15 to about 50 mol percent silica, (ii) about 10 to about 35 mol percent alumina, (iii) about 10 to about 35 mol percent of at least one alkali metal oxide, and (iv) about 15 to about 35 mol percent of a combination of at least one transition metal oxide and at least lanthanide series metal oxide.

According to certain illustrative embodiments, the inorganic fiber comprises the fiberization product of (i) about 15 to about 50 mol percent silica, (ii) about 10 to about 35 mol percent alumina, (iii) about 10 to about 35 mol percent dipotassium oxide, and (iv) about 15 to about 35 mol percent of at least one alkaline earth metal oxide, or at least one transition metal oxide, or at least lanthanide series metal oxide, or combinations thereof.

According to certain illustrative embodiments, the inorganic fiber comprises the fiberization product of (i) about 15 to about 50 mol percent silica, (ii) about 10 to about 35 mol percent alumina, (iii) about 10 to about 35 mol percent of at least one alkali metal oxide, and (iv) about 15 to about 35 mol percent of magnesium oxide.

According to certain illustrative embodiments, the inorganic fiber comprises the fiberization product of (i) about 15 to about 50 mol percent silica, (ii) about 10 to about 35 mol percent alumina, (iii) about 10 to about 35 mol percent of dipotassium oxide, and (iv) about 15 to about 35 mol percent of magnesium oxide.

According to certain illustrative embodiments, the inorganic fiber comprises the fiberization product of (i) about 15 to about 50 mol percent silica, (ii) about 10 to about 35 mol percent alumina, (iii) about 10 to about 35 mol percent of dipotassium oxide, and (iv) about 15 to about 35 mol percent of magnesium oxide, and where the amount of silica+alumina+dipotassium oxide is less than or equal to 80 mol percent.

According to certain illustrative embodiments, the inorganic fiber comprises the fiberization product of (i) about 15 to about 50 mol percent silica, (ii) about 10 to about 35 mol percent alumina, (iii) about 10 to about 35 mol percent of dipotassium oxide, and (iv) about 15 to about 35 mol percent of magnesium oxide, where the amount of silica+alumina+dipotassium oxide is less than or equal to 80 mol percent, and where the fiber after crystallization at elevated temperatures does not exhibit any crystalline silica phase as measured by x-ray diffraction (XRD). That is, no crystalline silica phase is detectable by XRD after crystallization of the inorganic fiber at high temperatures.

According to certain illustrative embodiments, the inorganic fiber comprises the fiberization product of (i) about 15 to about 50 mol percent silica, (ii) about 10 to about 35 mol percent alumina, (iii) about 10 to about 35 mol percent of dipotassium oxide, and (iv) about 15 to about 35 mol percent of magnesium oxide, where the amount of silica+alumina+dipotassium oxide is less than or equal to 80 mol percent, where the fiber experiencing crystallization at elevated temperatures does not exhibit any crystalline silica phase as measured by x-ray diffraction (XRD), and where the inorganic fiber exhibits low-biopersistence in acidic medium.

According to certain illustrative embodiments, the amount of silica (i) by mol percent in the inorganic fiber may from about 15 to about 45 mol percent, from about 15 to about 40 mol percent, from about 20 to about 40 mol percent, from about 15 to about 35 mol percent, from about 15 to about 30 mol percent, from about 20 to about 30 mol percent, from about 15 to about 25 mol percent, from about 15 to about 20 mol percent, from about 40 to about 50 mol percent, from about 40 to about 45 mol percent, and from about 40 to about 44 mol percent. According to certain illustrative embodiments, the amount of alumina (ii) in mol percent in the inorganic fiber may be from about 15 to about 30 mol percent, from about 15 to about 25 mol percent, and from about 15 to about 20 mol percent. According to certain illustrative embodiments, the amount of alkali metal oxide (iii) by mol percent in the inorganic fiber may be from about 15 to about 30 mol percent, from about 15 to about 25 mol percent, and from about 15 to about 20 mol percent. According to certain illustrative embodiments, alkaline earth metal oxide, or transition metal oxide, or lanthanide series metal oxide, or combinations thereof (iv), in mol percent may be from about 15 to about 30 mol percent, from about 15 to about 25 mol percent, and from about 15 to about 20 mol percent. Any of the above mol percents of the fiber components of (i), (ii), (iii) and (iv) may be combined to form the inorganic fiber. The mol percents of the fiber components (i), (ii), (iii) and (iv) cannot exceed 100 mol percent.

According to certain illustrative embodiments, the combined amount of alumina and the at least one alkali metal oxide is 30 mol percent or greater.

According to certain illustrative embodiments, the combined amount of alumina and the at least one alkali metal oxide is 34 mol percent or greater.

According to certain illustrative embodiments, the combined amount of alumina and the at one least alkali metal oxide is 30 mol percent or greater, wherein the amount of alumina is 14 mol percent or greater.

According to certain illustrative embodiments the combined amount of alumina and the at least one alkali metal oxide is 34 mol percent or greater, wherein the amount of alumina is 14 mol percent or greater.

It should be understood that when a range of values is described in the present disclosure, it is intended that any and every value within the range, including the end points, is to be considered as having been disclosed. For example, "a range of from about 15 to about 50 mol percent silica" is to be read as indicating each and every possible number along the continuum between 15 and 50. It is to be understood that the inventors appreciate and understand that any and all values within the range are to be considered to have been specified, and that the inventors have possession of the entire range and all the values within the range.

In the present disclosure, the term "about" used in connection with a value is inclusive of the stated value and has the meaning dictated by the context. For example, it includes at least the degree of error associated with the measurement of the particular value. One of ordinary skill in the art would understand the term "about" is used herein to mean that an amount of "about" of a recited value produces the desired degree of effectiveness in the compositions and/or methods of the present disclosure. One of ordinary skill in the art would further understand that the metes and bounds of "about" with respect to the value of a percentage, amount or quantity of any component in an embodiment can be determined by varying the value, determining the effectiveness of the compositions for each value, and determining the range of values that produce compositions with the desired degree of effectiveness in accordance with the present disclosure. The term "about" is further used to reflect the possibility that a composition may contain trace components of other materials that do not alter the effectiveness or safety of the composition.

In the present disclosure, the term "substantially" refers to a degree of deviation that is sufficiently small so as to not measurably detract from the identified property or circumstance. The exact degree of deviation allowable may in some cases depend on the specific context. The phrase "substantially free" means that the composition excludes any amount more than trace impurities that are not intentionally added to the fiber melt, but which may be present in the raw starting materials from which the fibers are produced.

The compositional mol percentages disclosed herein are based on the total mol percent of the components of the fiber. It will be understood to one of ordinary skill in the art that the total mol percent of the fiber cannot exceed 100%. For example, a person of ordinary skill in the art would easily recognize and understand that the fiberization product of (i) about 15 to about 50 mol percent silica, (ii) about 10 to about 35 mol percent alumina, (iii) about 10 to about 35 mol percent of at least one alkali metal oxide, and (iv) about 15 to about 35 mol percent of at least one alkaline earth metal oxide, or at least one transition metal oxide, or at least lanthanide series metal oxide, or combinations thereof will not exceed 100 mol percent. A person of ordinary skill in the art would understand that the mol percents of the fiber components will be adjusted to include the desired amount of components without exceeding 100 mol percent.

According to certain illustrative embodiments, the molar ratio of alkali metal oxide:alumina is in the range of about 1:1 to about 2:1. According to certain illustrative embodiments, the molar ratio of alkali metal oxide:alumina is in the range of about 1:1 to about 1.75:1. According to certain illustrative embodiments, the molar ratio of alkali metal oxide:alumina is in the range of about 1:1 to about 1.5:1. According to certain illustrative embodiments, the molar ratio of alkali metal oxide:alumina is in the range of about 1:1 to about 1.25:1. According to certain illustrative embodiments, the molar ratio of alkali metal oxide:alumina is in the range of about 1.25:1 to about 1.75:1. According to certain illustrative embodiments, the molar ratio of alkali metal oxide:alumina is in the range of about 1.5:1 to about 1.75:1. According to certain illustrative embodiments, the molar ratio of alkali metal oxide:alumina is in the range of about 1:3 to about 1:5. According to certain illustrative embodiments, the molar ratio of alkali metal oxide:alumina is in the range of about 1:3 to about 1:4.

The major crystalline phase in the inorganic fiber that is detected by XRD after exposure to 1260° C. for 24 hours is potassium aluminum silicate ($KAlSiO_4$). Other crystalline phases may include, for example, forsterite, spinel, potassium magnesium silicate ($K_2MgSi_3O_8$), leucite, and periclase. According to certain illustrative embodiments, the inorganic fiber contains 70 percent or greater potassium aluminum silicate as detected by XRD after exposure of the fiber to 1260° C. for 24 hours. The fiber contains no crystalline silica phase detectable by XRD.

According to certain illustrative embodiments, the inorganic fiber contains 70 percent or greater potassium aluminum silicate and from about 10 to about 30 percent forsterite ($Mg_2SiO_4$) as detected by XRD after exposure of the fiber to 1260° C. for 24 hours. The fiber contains no crystalline silica phase detectable by XRD.

According to certain illustrative embodiments, the inorganic fiber contains 70 percent or greater potassium aluminum silicate and from about 2 to about 10 percent forsterite ($Mg_2SiO_4$) as detected by XRD after exposure of the fiber to 1260° C. for 24 hours. The fiber contains no crystalline silica phase detectable by XRD.

According to certain illustrative embodiments, the inorganic fiber contains 70 percent or greater potassium aluminum silicate and from about 10 to about 30 percent of a combination of forsterite ($Mg_2SiO_4$) and leucite ($KAlSi_2O_6$) as detected by XRD after exposure of the fiber to 1260° C. for 24 hours. The fiber contains no crystalline silica phase detectable by XRD.

According to certain illustrative embodiments, the inorganic fiber contains 70 percent or greater potassium aluminum silicate and from about 10 to about 30 percent of forsterite ($Mg_2SiO_4$), and from about 2 to about 10 percent of spinel ($MgAl_2O_4$) as detected by XRD after exposure of the fiber to 1260° C. for 24 hours. The fiber contains no crystalline silica phase detectable by XRD.

According to certain illustrative embodiments, the inorganic fiber contains 70 percent or greater potassium aluminum silicate and from about 10 to about 30 percent of forsterite ($Mg_2SiO_4$), and from about 2 to about 10 percent of a combination of spinel ($MgAl_2O_4$) and potassium magnesium silicate as detected by XRD after exposure of the fiber to 1260° C. for 24 hours. The fiber contains no crystalline silica phase detectable by XRD.

Additionally provided is a method for making an inorganic fiber. According to certain illustrative embodiments, the method of making the fiber comprises combining raw material ingredients comprising (i) about 15 to about 50 mol percent silica, (ii) about 10 to about 35 mol percent alumina, (iii) about 10 to about 35 mol percent of at least one alkali metal oxide, and (iv) about 15 to about 35 mol percent of at least one alkaline earth metal oxide, or at least one transition metal oxide, or at least lanthanide series metal oxide, or combinations thereof to form a molten melt of raw material ingredients, and producing fibers from the molten melt.

According to certain embodiments, the method of making the fiber comprises forming a molten melt of raw material ingredients comprising (i) about 15 to about 50 mol percent silica, (ii) about 10 to about 35 mol percent alumina, (iii) about 10 to about 35 mol percent of at least one alkali metal oxide, and (iv) about 15 to about 35 mol percent of at least one alkaline earth metal oxide.

According to certain embodiments, the method of making the fiber comprises forming a molten melt of raw material ingredients comprising (i) about 15 to about 50 mol percent silica, (ii) about 10 to about 35 mol percent alumina, (iii) about 10 to about 35 mol percent of at least one alkali metal oxide, and (iv) about 15 to about 35 mol percent of at least one transition metal oxide.

According to certain embodiments, the method of making the fiber comprises forming a molten melt of raw material ingredients comprising (i) about 15 to about 50 mol percent silica, (ii) about 10 to about 35 mol percent alumina, (iii) about 10 to about 35 mol percent of at least one alkali metal oxide, and (iv) about 15 to about 35 mol percent of at least lanthanide series metal oxide.

According to certain embodiments, the method of making the fiber comprises forming a molten melt of raw material ingredients comprising (i) about 15 to about 50 mol percent silica, (ii) about 10 to about 35 mol percent alumina, (iii) about 10 to about 35 mol percent of at least one alkali metal oxide, and (iv) about 15 to about 35 mol percent of a combination of at least one alkaline earth metal oxide and at least one transition metal oxide.

According to certain embodiments, the method of making the fiber comprises forming a molten melt of raw material ingredients comprising (i) about 15 to about 50 mol percent silica, (ii) about 10 to about 35 mol percent alumina, (iii) about 10 to about 35 mol percent of at least one alkali metal oxide, and (iv) about 15 to about 35 mol percent of a combination of at least one alkaline earth metal oxide and at least lanthanide series metal oxide.

According to certain embodiments, the method of making the fiber comprises forming a molten melt of raw material ingredients comprising (i) about 15 to about 50 mol percent silica, (ii) about 10 to about 35 mol percent alumina, (iii) about 10 to about 35 mol percent of at least one alkali metal oxide, and (iv) about 15 to about 35 mol percent of a combination of at least one transition metal oxide and at least lanthanide series metal oxide.

According to certain embodiments, the method of making the fiber comprises forming a molten melt of raw material ingredients comprising (i) about 15 to about 50 mol percent silica, (ii) about 10 to about 35 mol percent alumina, (iii) about 10 to about 35 mol percent dipotassium oxide, and (iv) about 15 to about 35 mol percent of at least one alkaline earth metal oxide, or at least one transition metal oxide, or at least lanthanide series metal oxide, or combinations thereof.

According to certain embodiments, the method of making the fiber comprises forming a molten melt of raw material ingredients comprising (i) about 15 to about 50 mol percent silica, (ii) about 10 to about 35 mol percent alumina, (iii) about 10 to about 35 mol percent of at least one alkali metal oxide, and (iv) about 15 to about 35 mol percent of magnesium oxide.

According to certain embodiments, the method of making the fiber comprises forming a molten melt of raw material ingredients comprising (i) about 15 to about 50 mol percent silica, (ii) about 10 to about 35 mol percent alumina, (iii) about 10 to about 35 mol percent of dipotassium oxide, and (iv) about 15 to about 35 mol percent of magnesium oxide.

According to certain embodiments, the amount of silica+alumina+dipotassium oxide in the molten melt of raw material ingredients is less than or equal to 80 mol percent.

According to certain embodiments, the amount of alumina+the at least one alkali metal oxide in the molten melt of raw material ingredients is 30 mol percent or greater.

According to certain embodiments, the amount of alumina+the at least one alkali metal oxide is in the molten melt of raw material ingredients 34 mol percent or greater.

According to certain embodiments, the amount of alumina+the at one least alkali metal oxide in the molten melt of raw material ingredients is 30 mol percent or greater, and the amount of alumina in the molten melt of raw material ingredients is 14 mol percent or greater.

According to certain embodiments, the amount of alumina+the at least one alkali metal oxide in the molten melt of raw material ingredients is 34 mol percent or greater, and the amount of alumina in the molten melt of raw material ingredients is 14 mol percent or greater.

The inorganic fibers may be prepared by fiber blowing or fiber spinning techniques. A suitable fiber blowing technique includes the steps of mixing the starting raw materials together to form a material mixture of ingredients, introducing the material mixture of ingredients into a suitable vessel or container, melting the material mixture of ingredients for discharge through a suitable nozzle, and blowing a high pressure gas onto the discharged flow of molten material mixture of ingredients to form the fibers.

A suitable fiber spinning technique includes the steps of mixing the starting raw materials together to form a material mixture of ingredients, introducing the material mixture of ingredients into a suitable vessel or container, melting the material mixture of ingredients for discharge through a suitable nozzle onto spinning wheels. The molten stream then cascades over the wheels, coating the wheels and being thrown off through centripetal forces, thereby forming fibers.

The viscosity of the material melt of ingredients may optionally be controlled by the presence of other viscosity modifiers, in an amount sufficient to provide the fiberization required for the desired applications. The viscosity modifiers may be present in the raw materials which supply the main components of the melt, or may, at least in part, be separately added. Desired particle size of the raw materials is determined by furnacing conditions, including furnace size (SEF), pour rate, melt temperature, residence time, and the like.

Methods of thermally insulating an article at temperatures of 1260° C., or 1400° C., or greater are also provided. The method of thermally insulating an article in need thereof comprises disposing on, in, near, or around the article to be thermally insulated, a thermal insulation material comprising a plurality of inorganic fibers comprising the fiberization product of (i) about 15 to about 50 mol percent silica, (ii) about 10 to about 35 mol percent alumina, (iii) about 10 to about 35 mol percent of at least one alkali metal oxide, and (iv) about 15 to about 35 mol percent of at least one alkaline earth metal oxide, or at least one transition metal oxide, or at least lanthanide series metal oxide, or combinations thereof.

A method of providing a fire protection material to an article or structure in need thereof is also provided. The method comprises disposing on, in, near, or around the article or structure to be protected a fire protection material comprising a plurality of inorganic fibers comprising the fiberization product of (i) about 15 to about 50 mol percent silica, (ii) about 10 to about 35 mol percent alumina, (iii) about 10 to about 35 mol percent of at least one alkali metal oxide, and (iv) about 15 to about 35 mol percent of at least one alkaline earth metal oxide, or at least one transition metal oxide, or at least lanthanide series metal oxide, or combinations thereof.

The inorganic fibers may be formed into multiple different thermal insulation product forms. The thermal insulation product forms may include, without limitation, fiber-containing blankets, boards, papers, felts, mats, blocks, modules, coatings, cements, moldable compositions, pumpable compositions, putties, ropes, braids, wicking, textiles (such as cloths, tapes, sleeving, string, yarns, etc. . . . ), vacuum cast shapes and composites. The fiber may be used in combination with conventional materials utilized in the production of fiber-containing blankets, vacuum cast shapes and composites, as a substitute for conventional refractory ceramic fibers. The fiber may be used alone or in combination with other materials, such as binders, fillers, intumescent materials, endothermic materials, inorganic fibers of different chemical composition, and the like, in the production of fiber-containing paper and felt.

EXAMPLES

The following examples are set forth to describe illustrative embodiments of the inorganic fibers in further detail and to illustrate the methods of preparing the inorganic fibers, preparing thermal insulating articles containing the fibers and using the fibers as thermal insulation. However, the examples should not be construed as limiting the fiber, the fiber containing articles, or the processes of making or using the fibers as thermal insulation in any manner.

Linear Shrinkage

A shrinkage pad was prepared by needling a fiber mat using a bank of felting needles. A 3 inch×5 inch test piece was cut from the pad and was used in the shrinkage testing. The length and width of the test pad was carefully measured. The test pad was then placed into a furnace and brought to a temperature of 1400° C. for 24 hours. After heating for 24 hours, the test pad was removed from the test furnace and cooled. After cooling, the length and width of the test pad were measured again. The linear shrinkage of the test pad was determined by comparing the "before" and "after" dimensional measurements.

A second shrinkage pad was prepared in a manner similar to that disclosed for the first shrinkage pad. However, the second shrinkage pad was placed in a furnace and brought to a temperature of 1260° C. for 24 hours. After heating for 24 hours, the test pad was removed from the test furnace and cooled. After cooling, the length and width of the test pad were measured again. The linear shrinkage of the test pad was determined by comparing the "before" and "after" dimensional measurements.

Compression Recovery

The ability of the inorganic fibers to retain mechanical strength after exposure to a use temperature was evaluated by a compression recovery test. Compression recovery is a measure of the mechanical performance of an inorganic fiber in response to the exposure of the fiber to a desired use temperature for a given period of time. Compression recovery is measured by firing test pads manufactured from the inorganic fiber material to the test temperature for the selected period of time. The fired test pads are thereafter compressed to half of their original thickness and allowed to rebound. The amount of rebound is measured as percent recovery of the compressed thickness of the pad. Compression recovery was measured after exposure to use temperatures of 1260° C. for 24 hours and 168 hours, and 1400° C. for 24 hours and 168 hours.

Fiber Persistence Testing

Regarding biopersistence, there are two types of pH environments in the lung. There is a near-neutral pH environment found in the extracellular lung fluid having a pH generally in the range of about 7.4 to about 7.8. The second pH environment is a more acidic environment found in the alveolar macrophages and has a pH in the range of about 4.5 to about 5.

Biopersistence of the inorganic fiber may be tested by measuring the rate at which mass is lost from the fiber (ng/cm$^2$-hr) under conditions which are acidic, or which are neutral, which simulate the temperature and chemical conditions found in the human lung. This test consists of exposing approximately 0.1 g of de-shotted fiber to 50 ml of simulated lung fluid ("SLF") for 6 hours. The entire test system is maintained at 37° C., to simulate the temperature of the human body.

After the SLF has been exposed to the fiber, it is collected and analyzed for glass constituents using Inductively Coupled Plasma Spectroscopy. A "blank" SLF sample is also measured and used to correct for elements present in the SLF. Once this data has been obtained, it is possible to calculate the rate at which the fiber has lost mass over the time interval of the study. To measure the dissolution rate of fibers in simulated lung fluid, approximately 0.1 g of fiber is placed into a 50 ml centrifuge tube containing simulated lung fluid which has been warmed to 37° C. This is then placed into a shaking incubator for 6 hours and agitated at 100 cycles per minute. At the conclusion of the test, the tube is centrifuged and the solution is poured into a 60 ml syringe. The solution is then forced through a 0.45 μm filter to remove any particulate and tested for glass constituents using Inductively Coupled Plasma Spectroscopy analysis. This test may be conducted using either a near-neutral pH solution or an acidic solution. Although no specific dissolution rate standards exist, fibers with dissolution values in excess of 100 ng/cm$^2$-hr are considered indicative of a low-biopersistent fiber.

The composition for the simulated lung fluid, which was used to test the durability of the fiber compositions of the present invention:

| Constituent | Amount/Make-up |
|---|---|
| NH$_4$Cl | 10.72 g/50 mL |
| NaCl | 135.6 g |
| NaHCO$_3$ | 45.36 g |
| NaH$_2$PO$_4$•H$_2$O solution | 3.31 g/50 mL |
| Na$_3$C$_6$H$_5$O$_7$•H$_2$O solution | 1.18 g/50 mL |
| Glycine | 9.08 g |
| H$_2$SO$_4$ (1N solution) | 20.0 mL |
| CaCl$_2$ (2.75 wt. % solution) | 15.8 mL |
| Formaldehyde | 20.0 mL |

To approximately 18 liters of deionized water, sequentially add the above reagents in the amounts shown in the above table. Dilute the mixture to 20 liters with deionized water and continue to stir contents with magnetic stir bar or other suitable means for at least 15 minutes. For the preparation of acidic SLF, drops of hydrochloric acid are slowly added by pipette into the base solution (composition described above) while being stirring mixed until the pH value of the solution reaches 4.5.

TABLE I

| Sample | SiO$_2$ (mol %) | MgO (mol %) | Al$_2$O$_3$ (mol %) | K$_2$O (mol %) | Na$_2$O (mol %) | CaO (mol %) | Fe$_2$O$_3$ (mol %) | ZrO$_2$ (mol %) |
|---|---|---|---|---|---|---|---|---|
| C1 | 74.21 | 24.76 | 0.67 | 0 | 0 | 0.28 | 0 | 0 |
| 2 | 43.15 | 18.13 | 15.80 | 22.21 | 0.67 | 0 | 0.03 | 0 |
| 3 | 37.70 | 24.97 | 15.56 | 21.10 | 0.66 | 0 | 0.01 | 0 |
| 4 | 40.56 | 19.11 | 16.73 | 22.86 | 0.71 | 0 | 0.03 | 0 |
| 5 | 39 | 0 | 19.5 | 19.5 | 0 | 22 | 0 | 0 |
| 6 | 21.73 | 0 | 30.87 | 23.83 | 0.93 | 22.59 | 0.05 | 0 |
| 7 | 40.50 | 23.66 | 10.83 | 24.23 | 0.78 | 0 | 0.01 | 0 |
| 8 | 37.36 | 27.08 | 15.50 | 20.06 | 0 | 0 | 0.01 | 0 |
| 9 | 38.86 | 27.95 | 14.25 | 18.93 | 0 | 0 | 0.01 | 0 |
| 10 | 38.24 | 27.66 | 13.98 | 20.11 | 0 | 0 | 0.01 | 0 |
| 11 | 39.25 | 30.14 | 13.54 | 17.05 | 0 | 0 | 0.02 | 0 |
| 12 | 35.46 | 24.62 | 16.53 | 23.32 | 0 | 0 | 0.06 | 0 |
| 13 | 41.04 | 24.99 | 14.24 | 19.67 | 0 | 0 | 0.06 | 0 |
| 14 | 44.15 | 25.88 | 13.04 | 16.86 | 0 | 0 | 0.08 | 0 |
| 15 | 42.93 | 23.40 | 16.09 | 17.58 | 0 | 0 | 0.01 | 0 |
| 16 | 44.73 | 23.31 | 14.66 | 17.15 | 0.14 | 0 | 0.01 | 0 |
| 17 | 39.81 | 22.25 | 17.41 | 19.62 | 0 | 0 | 0 | 0.9 |
| 18 | 43.30 | 22.44 | 20.07 | 14.19 | 0 | 0 | 0 | 0 |
| 19 | 44.32 | 21.18 | 20.29 | 14.21 | 0 | 0 | 0 | 0 |
| 20 | 38.39 | 25.31 | 17.88 | 18.42 | 0 | 0 | 0 | 0 |
| 21 | 41.83 | 25.54 | 16.22 | 16.42 | 0 | 0 | 0 | 0 |
| 22 | 37.63 | 21.04 | 19.74 | 21.58 | 0 | 0 | 0 | 0 |
| 23 | 38.35 | 22.09 | 14.32 | 25.23 | 0 | 0 | 0 | 0 |
| 24 | 39.62 | 21.87 | 16.30 | 22.22 | 0 | 0 | 0 | 0 |

TABLE II

| Sample | Mean Fiber Diameter (μm) | Shrinkage (%) 1260° C. |
|---|---|---|
| C1 |  | 7.8 |
| 2 | 3.5 | 2.7 |
| 3 | 3.4 | 4.7 |
| 4 | 3.9 | 2.6 |
| 5 | 3.2 | 12 |
| 6 | 3.3 | 2.7 |
| 7 | 3.1 | 12.6 |
| 8 | 3.12 | 4.1 |

TABLE II-continued

| Sample | Mean Fiber Diameter (μm) | Shrinkage (%) 1260° C. |
|---|---|---|
| 9 | 3.1 | 15 |
| 10 | 4.5 | 13.4 |
| 11 | 3.2 | 14.2 |
| 12 | 2.7 | 8.1 |
| 13 | 3.8 | 3.1 |
| 14 | 3.1 | 51.9 |
| 15 | 3.7 | 17.3 |
| 16 | 3.5 | 44.6 |
| 17 | 3.5 | 9.1 |
| 18 | 3.6 | 8 |
| 19 | 4.9 | 5.7 |
| 20 | 3.8 | 10.1 |
| 21 | 5.2 | 8.3 |
| 22 | 5.7 | 4.8 |
| 23 | 5.8 | 5 |
| 24 |  | 3.7 |

TABLE III

| Sample | Compression Recovery (%) 1260° C. | Compressive Strength (psi) 1260° C. |
|---|---|---|
| C1 | 46 | 12 |
| 2 | 38 | 1.9 |
| 3 | 43 | 3.7 |
| 4 | 37 | 3.6 |
| 5 | 26 | 33.9 |
| 6 | 17 | 3.5 |
| 7 | 23 | 5.2 |
| 8 | 31 | 5.2 |
| 9 | 18 | 7.9 |
| 10 | 27 | 5.6 |
| 11 | 13 | 8.3 |
| 12 | 17 | 5.3 |
| 13 | 13 | 4.6 |
| 17 | 24 |  |
| 18 | 50 | 9 |
| 19 | 20 | 7 |
| 20 | 25 | 11 |
| 21 | 29 | 9.7 |
| 22 | 40 | 7 |
| 23 | 38 | 2.7 |
| 24 | 40 | 1.5 |

TABLE IV

| | 6 hr-Dissolution rate (ng/cm²/hr) | |
|---|---|---|
| Sample | Neutral | Acidic |
| C1 | 762 | 72 |
| 2 | 93 | 1052 |
| 3 | 110 | 1079 |
| 4 | 99 | 1061 |
| 5 | 267 | 1195 |
| 6 | 249 | 458 |
| 7 | 277 | 1171 |
| 8 | 202 | 1000 |
| 9 | 208 | 1093 |
| 11 | 217 | 1131 |
| 12 | 555 | 1098 |
| 13 | 193 | 977 |
| 14 | 167 | 767 |
| 15 | 182 | 787 |
| 16 | 136 | 424 |
| 17 | 231 | 774 |
| 18 | 214 | 978 |
| 19 | 339 | 1094 |
| 20 | 297 | 1041 |
| 21 | 249 | 794 |
| 22 | 150 | 964 |
| 23 | 194 | 1049 |

The biopersistence of illustrative embodiments of the inorganic fiber were tested and the results are set forth in Table IV above. The biopersistence was measured at near neutral pH which represents the approximate pH of extracellular human lung fluid. The biopersistence was also measured at an acidic pH of about 4.5 which represents the approximate pH of the internal environment of macrophages. The results of the fiber persistence testing shows that the present inorganic fibers exhibit a higher dissolution rate in an acidic medium as compared to the dissolution rate in a neutral or near neutral medium. This means that the fibers may exhibit water resistance or resistance in a moisture environment, while at the same time may be broken down into smeller fiber fragments by the acidic environment of the macrophages and effectively eliminated from the body. According to certain embodiments, inorganic fibers exhibit a dissolution rate in an acidic medium of about 500 to about 1200 (ng/cm²/hr) and a dissolution rate in a neutral or near neutral medium of about 100 to about 500 (ng/cm²/hr). According to certain embodiments, inorganic fibers exhibit a dissolution rate in an acidic medium of about 900 to about 1000 (ng/cm²/hr) and a dissolution rate in a neutral or near neutral medium of about 200 to about 300 (ng/cm²/hr). According to certain embodiments, inorganic fibers exhibit a dissolution rate in an acidic medium of about 950 to about 1000 (ng/cm²/hr) and a dissolution rate in a neutral or near neutral medium of about 250 to about 300 (ng/cm²/hr).

According to certain illustrative embodiments, the inorganic fiber exhibits a dissolution rate in a substantially neutral pH of about 100 (ng/cm²/hr), or about 200 (ng/cm²/hr), or about 225 (ng/cm²/hr), or about 250 (ng/cm²/hr), or about 275 (ng/cm²/hr), or about 300 (ng/cm²/hr), or about 400 (ng/cm²/hr) or about 500 (ng/cm²/hr). According to certain illustrative embodiments, the inorganic fiber exhibits a dissolution rate in a substantially neutral pH of about 100 to about 500 (ng/cm²/hr), or 100 to about 400 (ng/cm²/hr), or about 100 to about 300 (ng/cm²/hr), or about 100 to about 200 (ng/cm²/hr). According to further illustrative embodiments, the inorganic fiber exhibits a dissolution rate in a substantially neutral pH of about 125 to about 200 (ng/cm²/hr), or from about 150 to about 200 (ng/cm²/hr), or about 175 to about 200 (ng/cm²/hr), or about 200 to about 500 (ng/cm²/hr), or about 200 to about 400 (ng/cm²/hr), or about 200 to about 300 (ng/cm²/hr), or about 225 to about 300 (ng/cm²/hr), or about 250 to about 300 (ng/cm²/hr), or about 275 to about 300 (ng/cm²/hr), or about 300 to about 500 (ng/cm²/hr), or about 300 to about 400 (ng/cm²/hr), or about 400 to about 500 (ng/cm²/hr).

According to certain illustrative embodiments, the inorganic fiber exhibits a dissolution rate at an acidic pH of at least 300 (ng/cm²/hr), or at least 400 (ng/cm²/hr), or at least 500 (ng/cm²/hr), or at least 600 (ng/cm²/hr), or at least 700 (ng/cm²/hr), or at least 800 (ng/cm²/hr), or at least 900 (ng/cm²/hr), or at least 1000 (ng/cm²/hr), or at least 1100 (ng/cm²/hr), or at least 1200 (ng/cm²/hr). According to certain illustrative embodiments, the inorganic fiber exhibits a dissolution rate at an acidic pH of about 300 to about 1200 (ng/cm²/hr), or about 400 to about 1100 (ng/cm²/hr), or about 400 to about 1000 (ng/cm²/hr), or about 400 to about 900 (ng/cm²/hr), or about 500 to about 1100 (ng/cm²/hr), or about 600 to about 1100 (ng/cm²/hr), or about 700 to about 1100 (ng/cm²/hr), or about 800 to about 1100 (ng/cm²/hr), or about 900 to about 1100 (ng/cm²/hr), or about 700 to about 1100 (ng/cm²/hr), or about 700 to about 1000 (ng/cm²/hr), or about 700 to about 900 (ng/cm²/hr), or about 400 to 700 (ng/cm²/hr).

According to certain illustrative embodiments, the inorganic fiber exhibits a dissolution rate at a substantially neutral pH of at least 100 (ng/cm²/hr) and a dissolution rate in an acidic pH of at least 300 (ng/cm²/hr). According to certain illustrative embodiments, the inorganic fiber exhibits a dissolution rate at a substantially neutral pH of at least 200 (ng/cm²/hr) and a dissolution rate in an acidic pH of at least 400 (ng/cm²/hr). According to certain illustrative embodiments, the inorganic fiber exhibits a dissolution rate at a substantially neutral pH of at least 250 (ng/cm²/hr) and a dissolution rate in an acidic pH of at least 450 (ng/cm²/hr). According to certain illustrative embodiments, the inorganic fiber exhibits a dissolution rate at a substantially neutral pH of at least 200 (ng/cm²/hr) and a dissolution rate in an acidic pH of at least 700 (ng/cm²/hr). According to certain illustrative embodiments, the inorganic fiber exhibits a dissolution rate at a substantially neutral pH of at least 250 (ng/cm²/hr) and a dissolution rate in an acidic pH of at least 900 (ng/cm²/hr). According to certain illustrative embodiments, the inorganic fiber exhibits a dissolution rate at a substantially neutral pH of at least 250 (ng/cm²/hr) and a dissolution rate in an acidic pH of at least 1000 (ng/cm²/hr). According to certain illustrative embodiments, the inorganic fiber exhibits a dissolution rate at a substantially neutral pH of at least 250 (ng/cm²/hr) and a dissolution rate in an acidic pH of at least 1100 (ng/cm²/hr). According to certain illustrative embodiments, the inorganic fiber exhibits a dissolution rate at a substantially neutral pH of at least 300 (ng/cm²/hr) and a dissolution rate in an acidic pH of at least 1000 (ng/cm²/hr). According to certain illustrative embodiments, the inorganic fiber exhibits a dissolution rate at a substantially neutral pH of at least 500 (ng/cm²/hr) and a dissolution rate in an acidic pH of at least 1000 (ng/cm²/hr).

Flux Resistance Test

The flux resistance of a fiber pad prepared from the inorganic fibers of the present disclosure was analyzed. A cylindrical hole with diameter of 1" is punched in a 3"×5"×1" needled pad, which is then placed in between another two needled pads of the same size and fiber, with one needled pad at the bottom and the other needled pad on the top. The cylindrical hole is then filled with a powder flux agent of certain amount. The stacked pads are fired at 1260° C. for 6 hrs. The appearance of where the flux agent is in contact with fiber pad is examined to determine the extent of corrosion of fibers under fluxing agent. $K_2CO_3$, $Na_2CO_3$, $Na_2B_4O_7$ were used as the fluxing agents for this test.

TABLE V

| Sample | $K_2CO_3$ (6 g) | $K_2CO_3$ (3 g) | $Na_2CO_3$ (6 g) | $Na_2B_4O_7$ (1.5 g) |
|---|---|---|---|---|
| C1 | Reacted | Reacted | Reacted | Reacted |
| 19 | Good - no reaction | Good- no reaction | Good- no reaction | Reacted |
| 24 | Good- no reaction | Good- no reaction | Good- no reaction | Reacted |

Alumina Compatibility Test

Compatibility of fiber pad of the inventive inorganic fibers was evaluated. Needled fiber pads were laid on a layer of alumina powder and fired at 1150° C. for 14 days. After firing, the appearance of the fiber pad where it was in contact with the alumina powder was examined to determine the extent of reaction between alumina and fibers. If the alumina powders were sticking on the fiber pad surface, it indicated that a reaction has taken place, and thus poor compatibility between alumina and fibers. Otherwise, the fibers are compatible with alumina if little or no reaction is between the alumina powder and the needled fiber pad was observed. The results of the alumina compatibility testing is set forth in Table VI below.

TABLE VI

| Sample | Result |
|---|---|
| AES 1* | Reacted; alumina sticking on pad bottom. |
| AES 2* | Reacted; alumina sticking on pad bottom. |
| 3 | Alumina powder not sticking on pad bottom. |
| 4 | Alumina powder not sticking on pad bottom. |
| 8 | Alumina powder not sticking on pad bottom. |
| 13 | Alumina powder not sticking on pad bottom. |
| 23 | Alumina powder not sticking on pad bottom. |

*the abbreviation "AES" means alkaline earth silicate fibers.

Figure 2:
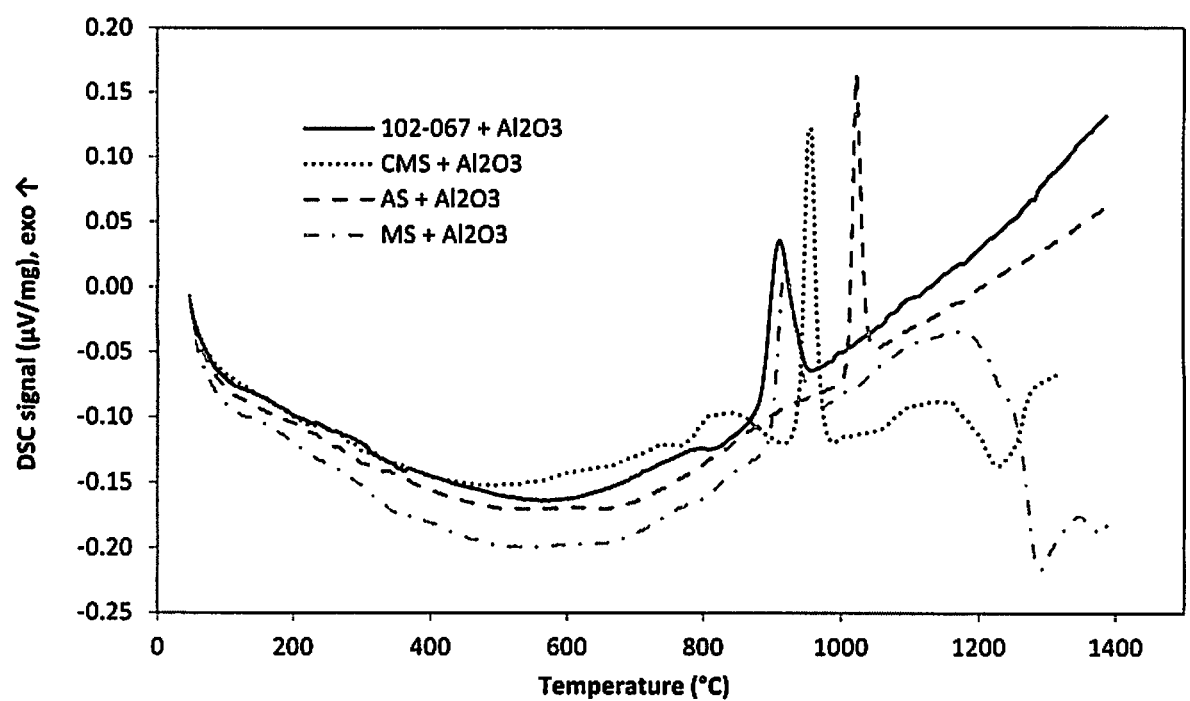
FIG. 2 is a graph showing DSC curves for mixtures of alumina powder and the inventive fiber as compared to mixtures of alumina powder and known fibers.

Another manner in which to evaluate at the compatibility of the inorganic fiber with alumina is by observing the differential scanning calorimetry (DSC) of a mixture of 50 wt % fibers and 50 wt % alumina. The fibers and alumina mixture was ball milled. DSC was run at heating rate of 20° C./min up to 1400° C. The graph of FIG. 2 shows the DSC curves for the mixtures of alumina with the fiber of Sample 5, alkaline earth silicate fibers (calcia magnesia silicate fiber; magnesia silicate fiber), and alumina silicate fiber ($SiO_2$ 56 wt %, $Al_2O_3$ 44 wt %). The fall-off's at the high-temperature end in the DSC curves of alkaline earth silicate fibers with alumina indicate a reaction occurred. On the other hand, this is not observed in the DSC curves for the inventive inorganic fiber with alumina or the reference alumina-silicate fiber with alumina, which demonstrates that there was little or no reaction between the inventive fiber and alumina.

XRD Testing

Fiber samples were heat treated at 1260° C. for 24 hours. 10 grams of each heat treated fiber sample was milled for 3 minutes. X-ray diffraction (XRD) measurements of the powder fiber samples were performed on a Phillips APD 3600 system run by Jade software. The XRD scan was performed with the conditions of 2 sec. counts per 0.02 degree stepsize from 6 to 60 degrees 2-θ. XRD analyses were performed through RIR semi-Quantitative analysis using α-$Al_2O_3$ as an internal standard for the analysis.

The crystal phases of certain illustrative inorganic fibers detected by XRD after heat treatment at 1260° C. for 24 hours are set forth in Table VII below.

TABLE VII

| Example | Major (>70 wt %) | Moderate (10-30 wt %) | Low (2-10 wt %) | Faint (<2 wt %) |
|---------|------------------|----------------------|-----------------|-----------------|
| 2 | $K(AlSiO_4)$, Potassium Aluminum silicate; | | $Mg_2SiO_4$, Forsterite; | $(Mg_{0.64}Fe_{0.111}Al_{0.249})(Mg_{0.227}Al_{1.75})O_4$, spinel; $K_2MgSi_3O_8$, Potassium Magesium silicate |
| 3 | $K(AlSiO_4)$, Potassium Aluminium silicate; | $Mg_2SiO_4$, Forsterite; | $MgAl_2O_4$, Spinel; $K_2MgSi_3O_8$, Potassium Magesium silicate; | MgO, periclase |
| 4 | $K(AlSiO_4)$, Potassium Aluminium silicate; | $Mg_2SiO_4$, Forsterite; | $MgAl_2O_4$, Spinel; | $K_2MgSi_3O_8$, Potassium Magesium silicate; MgO, periclase; amorphous phase |
| 8 | $K(AlSiO_4)$, Potassium Aluminium silicate; | $Mg_2SiO_4$, Forsterite; | $MgAl_2O_4$, Spinel; | $K_2MgSi_3O_8$, Potassium Magesium silicate; MgO, periclase |
| 9 | $K(AlSiO_4)$, Potassium Aluminium silicate; | $Mg_2SiO_4$, Forsterite; | | $MgAl_2O_4$, Spinel; MgO, periclase; $K_2MgSi_3O_8$, Potassium Magesium silicate; |
| 11 | $K(AlSiO_4)$, Potassium Aluminium silicate; | $Mg_2SiO_4$, Forsterite; | | $MgAl_2O_4$, Spinel; $K_2MgSi_3O_8$, Potassium Magesium silicate; MgO, periclase |
| 14 | $K(AlSiO_4)$, Potassium Aluminium silicate; | $Mg_2SiO_4$, Forsterite; $KAlSi_2O_6$ leucite; | | $MgAl_2O_4$, Spinel; $K_2MgSi_3O_8$, Potassium Magesium silicate; MgO, periclase; $SiO_2$ (quartz, cristobalite), ~1.7% |
| 12 | $K(AlSiO_4)$, Potassium Aluminium silicate; | | $Mg_2SiO_4$, Forsterite; $MgAl_2O_4$, Spinel; $K_2MgSi_3O_8$, Potassium Magesium silicate; MgO, periclase | |
| 13 | $K(AlSiO_4)$, Potassium Aluminium silicate; | | $Mg_2SiO_4$, Forsterite; $MgAl_2O_4$, Spinel; $K_2MgSi_3O_8$, Potassium Magesium silicate; MgO, periclase | |
| 15 | $K(AlSiO_4)$, Potassium Aluminium silicate; | | $Mg_2SiO_4$, Forsterite; $MgAl_2O_4$, Spinel; $K_2MgSi_3O_8$, Potassium Magesium silicate; MgO, periclase; KAlSi2O6, leucite | |
| 16 | $K(AlSiO_4)$, Potassium Aluminium silicate; | | $Mg_2SiO_4$, Forsterite; $MgAl_2O_4$, Spinel; $K_2MgSi_3O_8$, Potassium Magesium silicate; MgO, periclase; $SiO_2$ (tridymite, cristobalite), faint | |
| 17 | $K(AlSiO_4)$, Potassium Aluminium silicate; | | $Mg_2SiO_4$, Forsterite; $MgAl_2O_4$, Spinel; $K_2MgSi_3O_8$, Potassium Magesium silicate; $ZrO_2$ | |

While the inorganic fiber, thermal insulation, methods of preparing the inorganic fiber, and method of insulating articles using the thermal insulation have been described in connection with various embodiments, it is to be understood that other similar embodiments may be used or modifications and additions may be made to the described embodiments for performing the same function. Furthermore, the various illustrative embodiments may be combined to produce the desired results. Therefore, the inorganic fiber, thermal insulation, methods of preparing the inorganic fiber, and method of insulating articles using the thermal insulation should not be limited to any single embodiment, but rather construed in breadth and scope in accordance with the recitation of the appended claims. It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

The invention claimed is:

1. An inorganic fiber comprising the fiberization product of
   (i) 15 to 50 mol percent silica;
   (ii) 10 to 28 mol percent alumina;
   (iii) 16.7 to 35 mol percent of an alkali metal oxide; and
   (iv) 15 to 35 mol percent of at least one alkaline earth metal oxide;
   wherein the amount of silica+alumina+alkali metal oxide is 80 mol percent or less;
   wherein a molar ratio of alkali metal oxide to the alumina is from 1.25 to 2;
   wherein the amount of alumina+alkali metal oxide is 30 mol percent or greater; and
   wherein the inorganic fiber exhibits a linear shrinkage after exposure to 1260° C. for 24 hours of 5% or less.

2. The inorganic fiber of claim 1, wherein the amount of alumina is 13 mol percent or greater.

3. The inorganic fiber of claim 1, wherein the amount of alumina+alkali metal oxide is 34 mol percent or greater.

4. The inorganic fiber of claim 3, wherein the amount of alumina+alkali metal oxide is 34 mol percent or greater, wherein the amount of alumina is 14 mol percent or greater.

5. The inorganic fiber of claim 1, wherein the molar ratio of alkali metal oxide to the alumina is from 1.3 to 2.

6. The inorganic fiber of claim 1, comprising the fiberization product of
   (i) 15 to 50 mol percent silica;
   (ii) 10 to 28 mol percent alumina;
   (iii) 16.7 to 35 mol percent dipotassium oxide, and
   (iv) 15 to 35 mol percent of at least one alkaline earth metal oxide.

7. The inorganic fiber of claim 1, comprising the fiberization product of
   (i) 15 to 50 mol percent silica;
   (ii) 10 to 28 mol percent alumina;
   (iii) 16.7 to 35 mol percent of the alkali metal oxide; and
   (iv) 15 to 35 mol percent of magnesium oxide.

8. The inorganic fiber of claim 1, comprising the fiberization product of
(i) 15 to 50 mol percent silica;
(ii) 10 to 28 mol percent alumina;
(iii) 16.7 to 35 mol percent of dipotassium oxide; and
(iv) 15 to 35 mol percent of magnesium oxide.

9. The inorganic fiber of claim 1, wherein said fiber does not exhibit crystalline silica phase as measured by x-ray diffraction (XRD) after exposure to 1260° C. for 24 hours.

10. The inorganic fiber of claim 9, wherein said inorganic fiber exhibits a 6 hour dissolution rate in an acidic medium that is greater than the 6 hour dissolution rate in a neutral or near neutral medium.

11. A thermal insulation or fire protection material prepared from a plurality of the inorganic fibers of claim 1, the material selected from blankets, blocks, boards, caulking compositions, cement compositions, coatings, felts, mats, moldable compositions, modules, papers, pumpable compositions, putty compositions, sheets, tamping mixtures, vacuum cast shapes, vacuum cast forms, or woven textiles, braids, cloths, fabrics, ropes, tapes, sleeving, and wicking.

12. A method for making the inorganic fiber comprising:
combining raw material ingredients comprising
i) 15 to 50 mol percent silica,
(ii) 10 to 35 mol percent alumina,
(iii) 15 to 28 mol percent of an alkali metal oxide, and
(iv) 16.7 to 35 mol percent of at least one alkaline earth metal oxide to form a molten melt of raw material ingredients; and
producing fibers from the molten melt;
wherein the amount of silica+alumina+alkali metal oxide is 80 mol percent or less;
wherein a molar ratio of alkali metal oxide to the alumina is from 1.25 to 2;
wherein the amount of alumina+alkali metal oxide is 30 mol percent or greater; and
wherein the inorganic fiber exhibits a linear shrinkage after exposure to 1260° C. for 24 hours of 5% or less.

13. A method of thermally insulating an article at temperatures of 1260° C. and greater, comprising disposing on, in, near, or around the article to be thermally insulated, a thermal insulation material comprising a plurality of inorganic fibers of claim 1.

14. A method of thermally insulating an article at temperatures of 1400° C. and greater, or providing fire protection to said article, comprising disposing on, in, near or around the article to be thermally insulated, a thermal insulation material comprising a plurality of inorganic fibers of claim 1.

* * * * *

UNITED STATES PATENT AND TRADEMARK OFFICE
CERTIFICATE OF CORRECTION

PATENT NO. : 11,203,551 B2
APPLICATION NO. : 16/152878
DATED : December 21, 2021
INVENTOR(S) : Donghui Zhao et al.

It is certified that error appears in the above-identified patent and that said Letters Patent is hereby corrected as shown below:

In the Claims

Claim 2, Column 18, Line 45, change "13" to --14--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*